US011369866B2

(12) United States Patent
Walker (10) Patent No.: US 11,369,866 B2
(45) Date of Patent: Jun. 28, 2022

(54) POSITION TRACKING APPARATUS AND METHOD (71) Applicant: Sony Interactive Entertainment Inc., Tokyo (JP)

(72) Inventor: Andrew William Walker, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 27 days.

(21) Appl. No.: 16/761,020

(22) PCT Filed: Dec. 13, 2018

(86) PCT No.: PCT/GB2018/053616
§ 371 (c)(1),
(2) Date: May 1, 2020

(87) PCT Pub. No.: WO2019/122824
PCT Pub. Date: Jun. 27, 2019

(65) Prior Publication Data
US 2021/0121775 A1 Apr. 29, 2021

(30) Foreign Application Priority Data
Dec. 21, 2017 (GB) .................................. 1721541

(51) Int. Cl.
A63F 13/212 (2014.01)
A63F 13/213 (2014.01)
(Continued)

(52) U.S. Cl.
CPC .......... A63F 13/212 (2014.09); A63F 13/213 (2014.09); A63F 13/23 (2014.09);
(Continued)

(58) Field of Classification Search
CPC ... A63F 13/212; A63F 2300/121; G06F 3/011
See application file for complete search history.

(56) References Cited

U.S. PATENT DOCUMENTS

2006/0187193 A1    8/2006  Esquilin
2009/0256800 A1*  10/2009  Kaufman ............... G06F 3/011
                                                    345/156
(Continued)

FOREIGN PATENT DOCUMENTS

EP    2559463 A2    2/2013
EP    3067783 A1    9/2016
(Continued)

OTHER PUBLICATIONS

International Search Report and Written Opinion for corresponding PCT Application No. PCT/GB2018/053616, 14 pages, dated Feb. 19, 2019.
(Continued)

Primary Examiner — Jay Trent Liddle
(74) Attorney, Agent, or Firm — Matthew B. Dernier, Esq.

(57) ABSTRACT

A positional tracking system for tracking a user includes: a plurality of tracking units to be worn by a user, a tracking unit identification unit operable to identify the plurality of tracking units, and a position identification unit operable to identify a position of a user in dependence upon the location of the plurality of tracking units, where each of the plurality of tracking units is operable to transmit a signal that may be used to locate that tracking unit, and wherein the transmitted signal comprises information identifying the transmitting tracking unit and its position and/or orientation.

14 Claims, 9 Drawing Sheets (51) Int. Cl.
*A63F 13/23* (2014.01)
*A63F 13/285* (2014.01)
*A63F 13/211* (2014.01)
*A63F 13/22* (2014.01)
*G06F 3/01* (2006.01)

(52) U.S. Cl.
CPC .......... *A63F 13/285* (2014.09); *A63F 13/211* (2014.09); *A63F 13/22* (2014.09); *A63F 2300/105* (2013.01); *A63F 2300/1012* (2013.01); *A63F 2300/1018* (2013.01); *A63F 2300/1025* (2013.01); *A63F 2300/1037* (2013.01); *A63F 2300/1087* (2013.01); *G06F 3/011* (2013.01)

(56) References Cited

U.S. PATENT DOCUMENTS

| | | | | |
|---|---|---|---|---|
| 2010/0009752 | A1* | 1/2010 | Rubin | A63F 13/235 463/36 |
| 2012/0157263 | A1* | 6/2012 | Sivak | G16H 50/50 482/4 |
| 2014/0287807 | A1* | 9/2014 | Cohen | A63F 13/00 463/7 |
| 2015/0258431 | A1 | 9/2015 | Stafford | |
| 2015/0348330 | A1* | 12/2015 | Balachandreswaran | A63F 13/285 463/5 |
| 2016/0187974 | A1 | 6/2016 | Mallinson | |
| 2016/0227509 | A1 | 8/2016 | Krenz | |
| 2016/0246369 | A1* | 8/2016 | Osman | G06F 3/0346 |
| 2016/0246370 | A1* | 8/2016 | Osman | A63F 13/213 |
| 2016/0275722 | A1 | 9/2016 | Bretschneider | |
| 2016/0316336 | A1 | 10/2016 | Krenz | |
| 2017/0007919 | A1* | 1/2017 | Cohen | A63F 13/21 |
| 2018/0053056 | A1* | 2/2018 | Rabinovich | A63F 13/211 |
| 2020/0057476 | A1* | 2/2020 | Robinson | G06F 3/014 |

FOREIGN PATENT DOCUMENTS

| | | |
|---|---|---|
| WO | 9848338 A2 | 10/1998 |
| WO | 2017076224 A1 | 5/2017 |
| WO | 2017088068 A1 | 6/2017 |

OTHER PUBLICATIONS

Combined Search and Examination Report for corresponding GB Application No. 1721541.9, 9 pages, dated Jun. 20, 2018.
Communication pursuant to Article 94.3 for corresponding EP Application No. 18822454.7, 5 pages, dated Mar. 12, 2021.

* cited by examiner

POSITION TRACKING APPARATUS AND METHOD

BACKGROUND OF THE INVENTION

Field of the Invention

This disclosure relates to a position tracking apparatus and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Position tracking of a user may be useful in many scenarios, particularly in gaming or virtual reality (VR) contexts. Positional tracking may allow a user to interact with a piece of content, or enable an appropriate viewpoint to be defined within the content, for example.

An example of positional tracking of a player of a game is that of the EyeToy camera (and corresponding games, such as EyeToy: Play) released for the Sony® PlayStation® 2 in 2003. This arrangement is used to capture images of a player, which are then presented on screen and used to interact with the content. For example, a user may move their arms such that they overlap with an on-screen object so as to 'hit' or otherwise interact with that object.

Positional tracking has continued in much the same manner in the years since the release of the EyeToy, albeit with more sophisticated cameras and image processing to better identify a player. Nevertheless, there are many drawbacks associated with such camera-based arrangements.

For example, image processing to identify a player within the captured images may result in a large processing burden being placed on a processing device. This means that resources that could be used for generating a higher-quality gaming experience are otherwise occupied, and that a user is not provided with an optimal experience.

The reduction of this processing burden is therefore a motivating factor when developing further positional tracking arrangements.

When using cameras, previously proposed arrangements have included the provision of recognisable elements within the captured images. For example, the use of AR markers or objects with uncommon (relative to the colours in a typical tracking environment) may be used as easily-identifiable tags such that an image processing operation may be performed more efficiently.

An additional development in the field of player tracking has been that of peripherals that are capable of performing their own measurements of motion using gyroscopes or accelerometers or the like. An early example of this is the Nintendo® Wii Remote, which allowed motion inputs to be provided to a game using an accelerometer operable to sense acceleration along all three axes. By using such peripherals, an image processing burden may be reduced as these measurements may replace some or all of those usually provided by an image processing method.

However, the use of peripherals is not considered to be suitable for all applications as the data that is generated is often not sufficient for complex position tracking.

It is in the context of the above problems that the present invention arises.

SUMMARY OF THE INVENTION

Various aspects and features of the present disclosure are defined in the appended claims and within the text of the accompanying description and include at least a positional tracking system and a method of operating a positional tracking system, as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

The techniques described within will be described with reference to use with a head-mountable display device (HMD). This is because positional tracking techniques are often desirable for use with HMDs to provide immersive VR experiences to a user. However, it should be considered that use of these techniques with an HMD is not required, and that any display device may be compatible with such positional tracking techniques.

Figure 1:
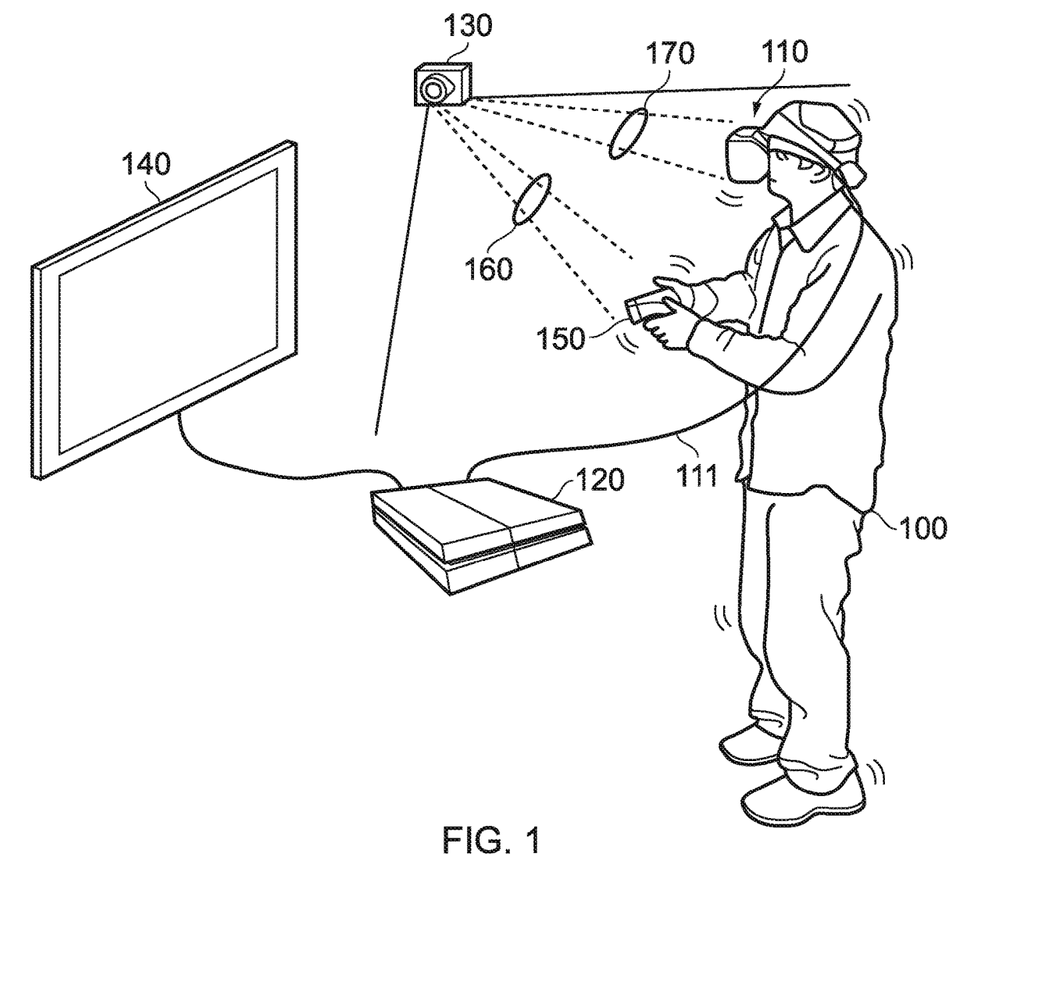
FIG. 1 schematically illustrates an entertainment system.

Referring now to the drawings, wherein like reference numerals designate identical or corresponding parts throughout the several views, FIG. 1 schematically illustrates an entertainment system in use by a user 100. This system comprises an HMD 110, a processing device 120, a camera 130 and a television 140.

The HMD 110 is operable to provide images to a user 100. These images may be generated by the processing device 120 and received via a connection 111, for example. This connection 111 may be any suitable wired or wireless connection, of course, such as an HMDI cable or a Wi-Fi connection.

The processing device 120 is operable to generate images for display by the HMD 110, in addition to performing any additional processing such as positional tracking of the user 100 and the like. The processing device 120 may be operable to generate images for display in response to inputs by the user 100 via an input device 150. The processing device 120 may also be operable to output images to the television 140, instead of or in addition to outputting images to the HMD 110.

A camera 130 is provided that is operable to capture images of the user 100. In particular, the camera may capture images of the input device 150 (via view 160) and the HMD 110 (via view 170) in order to enable tracking to be performed using image processing techniques.

Figure 2:
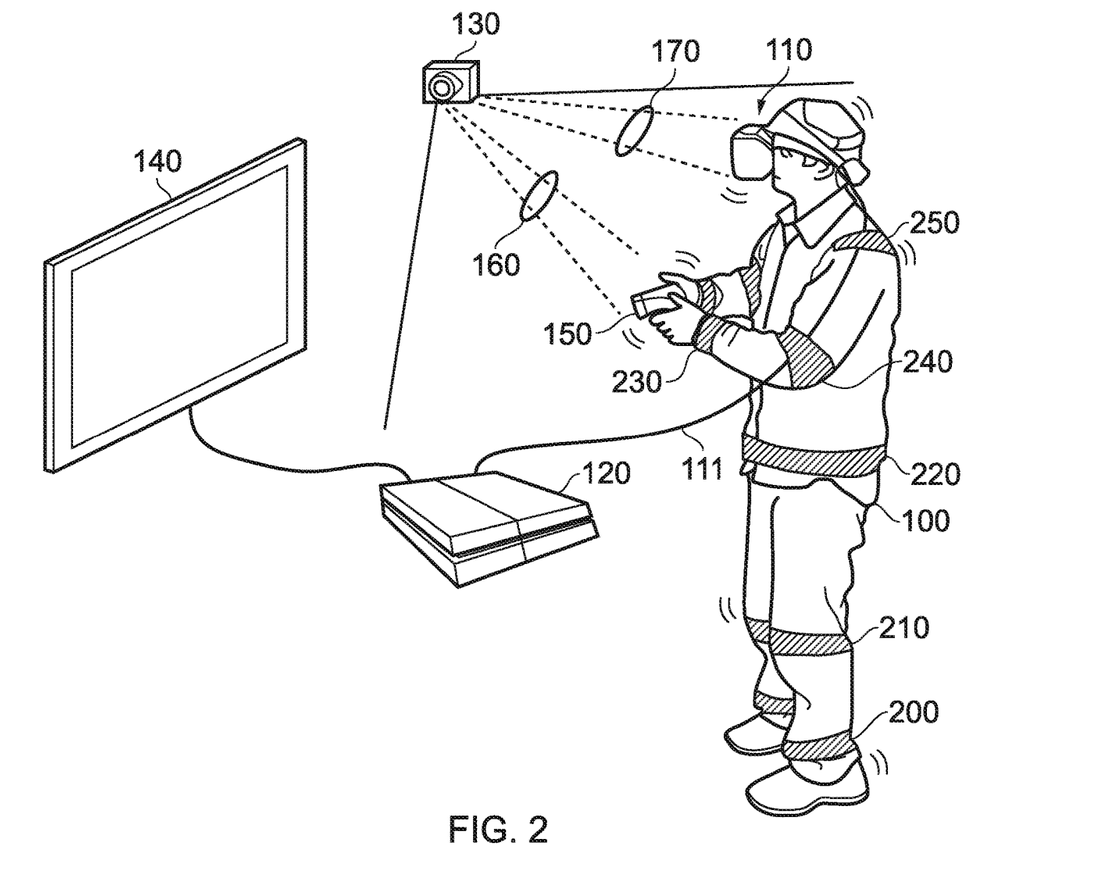
FIG. 2 schematically illustrates a positional tracking system.

FIG. 2 schematically illustrates the entertainment system of FIG. 1, with the addition of a plurality of tracking units that are worn by the user 100. These tracking units are operable to provide information (such as information from a gyroscope or accelerometer) to assist with a positional tracking technique, or emit signals (for example, magnetic signals) that assist with such a technique.

A first pair of tracking units 200 are worn around the ankles, a second pair 210 are worn around the knees, a tracking unit 220 is worn around the waist, a third pair 230 are worn around the wrists, a fourth pair 240 around the wrists and a fifth pair 250 around the user's shoulders. In general, the tracking units are intended to be worn by a user on their joints; this may be advantageous in a number of ways, for example in building a model of the user's pose.

The tracking units may be attached to a user in any suitable manner; for example, fastenable or elasticated straps may be particularly appropriate, or the use of pins or Velcro® may also be suitable.

While pairs of tracking units are illustrated in FIG. 2, this need not be the case. For example, only a user's dominant foot or hand may be tracked (as this is likely to be indicative of a large proportion of attempted interactions by the user). It may also be possible to omit tracking units if they are in close proximity to other tracking devices; for example, it may be unnecessary to use a tracking unit on a user's wrist if that hand is already holding a trackable peripheral (such as the input device 150).

The tracking unit 220 may resemble a belt in some embodiments, in that it is to be worn around the waist. Alternatively, a number of separate trackable units may be provided in place of the tracking unit 220; for example, they may be pinned to a user's clothes in a number of positions.

Figure 3:
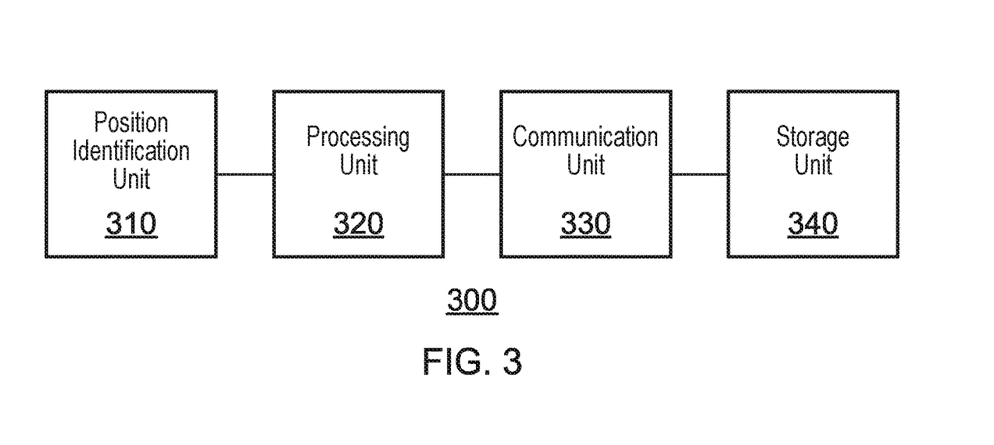
FIG. 3 schematically illustrates a positional tracking unit.

FIG. 3 schematically illustrates a positional tracking unit such as those shown in FIG. 2. The tracking unit 300 comprises a position identification unit 310, a processing unit 320, a communication unit 330 and a storage unit 340.

The position identification unit 310 may comprise any suitable hardware for determining the position of the tracking unit 300. Examples of suitable hardware include accelerometers and gyroscopes or magnetic field sensors, operable to detect motion, position and/or orientation of the tracking unit 300. In addition to this hardware, the position identification unit 310 may be operable to process the data generated by the hardware in order to determine the location/orientation of the tracking unit 300.

The processing unit 320 is operable to perform processing to control operation of the tracking unit 300. For example, in some situations the tracking unit 300 may not be required for tracking, and the processing unit 320 is operable to prevent the operation of the position identification unit 310. The processing unit 320 may also be operable to modify information stored in the storage unit 340, such as an identifier that identifies the tracking unit 300 from amongst a plurality of tracking units 300.

The communication unit 330 is operable to communicate with external devices or to otherwise emit signals from the tracking unit 300. For example, the communication unit 330 may be operable to transmit data to (and receive data from) other tracking units 300, the HMD 110, and/or the processing device 120, for example by a wired connection to the HMD and optionally thereafter on to the processing device 120, or by wireless communication to one or both of the HMD and processing device as appropriate.

In some embodiments, instead of (or in addition to) transmitting/receiving data in the manner described above, the communication unit 330 is operable to emit signals that are able to be detected by one or more of these other devices. For example, the communication unit 330 may be operable to emit magnetic pulses of a predetermined strength that, when detected by another device, may be indicative of a distance between the detecting device and the tracking unit 300.

The storage unit 340 is operable to store information relevant for the operation of the tracking unit 300. For example, this may include a unique identifier (such as a serial number), or an identification of a 'type' of unit (for example, a wrist tracking unit).

Figure 4:
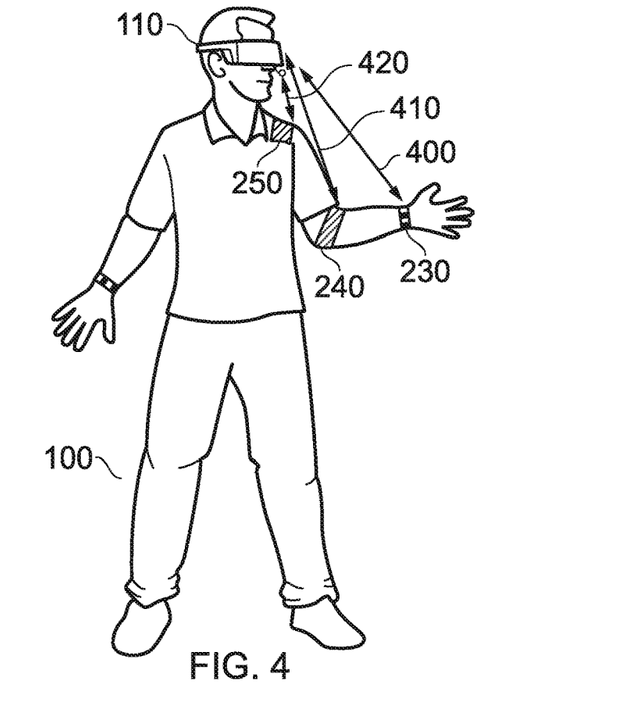
FIGS. 4 and 5 schematically illustrate tracking arrangements.

FIG. 4 schematically illustrates a communication method between tracking units and a central unit. In this example, the HMD 110 acts as the central unit with which each of the tracking units may communicate; however, this function could be performed by the processing device 120 or any other unit operable to communicate with the tracking units.

In this Figure, it is shown that each of the tracking units 230, 240 and 250 are in communication with the HMD 110 via respective links 400, 410 and 420. As noted above these links 400, 410, 420 may comprise any suitable wired or wireless connection (e.g. Bluetooth®).

The tracking units 230, 240 and 250 are operable to transmit signals that may be used to locate the tracking units 230, 240 and 250. As discussed above, this may comprise location/orientation information generated by the position identifying unit 310 of each respective tracking unit.

Figure 5:
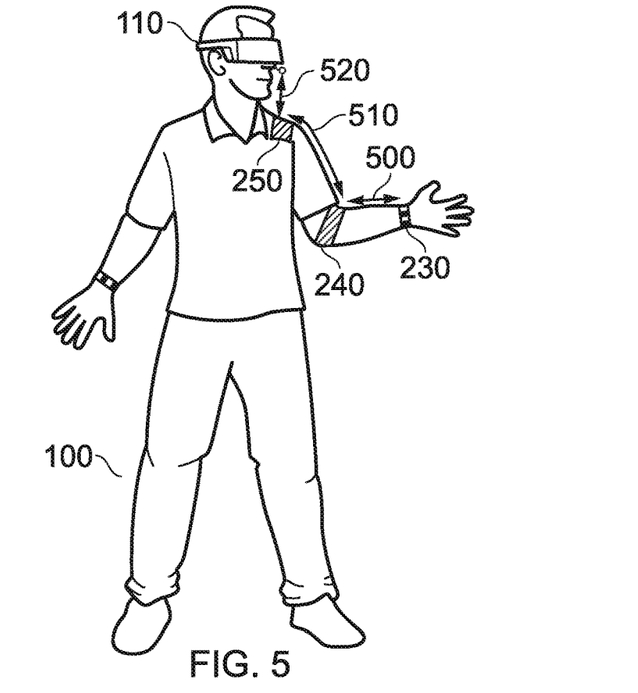

In the arrangement shown in FIG. 5, the tracking units 230, 240 and 250 are instead configured to interact with each other, rather than each communicating with a central unit directly. This may be advantageous in reducing the power requirements of the positional tracking system, for example. Of course, the positional tracking system may be configured so as to be able to switch between these two operation modes (that is, those shown in FIGS. 4 and 5 respectively) as desired.

In this arrangement, the tracking unit 230 communicates with the tracking unit 240 via a link 500. The tracking unit 240 communicates with the tracking unit 250 via a link 510. The tracking unit 250 communicates with the HMD 110 via a link 520. Each of these communication links may be one-way or bidirectional. Of course, each of the intermediate tracking units (in this case, the units 240 and 250) should be operable to pass on or otherwise integrate information received from the other tracking units from which they receive signals into the output signals. Alternatively or in addition, a tracking unit may act as a passive relay or transmission path between the HMD upstream and another tracking unit downstream, in a manner analogous to chaining USB devices together.

A hierarchy of tracking units may therefore be defined, in an arrangement in which each tracking unit communicates with and/or via a neighbouring tracking unit. For example, a separate 'chain' may be defined for each limb, such that a single tracking unit corresponding to each limb transmits information to the central unit that is obtained or relayed from each other tracking unit corresponding to that same limb. In the Example shown, the chain that is illustrated corresponds to the user's left arm and comprises the tracking units 230, 240 and 250, with the tracking unit 250 being designated as the tracking unit that is to communicate with the central unit (in this case, the HMD 110).

This hierarchical arrangement therefore utilises a plurality of tracking units that are grouped into two or more groups (for example, one corresponding to each limb), and are configured to communicate with and detect outputs of other tracking units in that group or at least to relay such information upstream. In some embodiments, each of the tracking units is operable to communicate with a next tracking unit in the group (such as the next tracking unit/device in the hierarchy, rather than any other tracking unit/device in that group), with a single tracking unit in each group being configured to communicate with a device other than a tracking unit.

While the arrangements of FIGS. 4 and 5 are discussed with reference to direct communication links, in some embodiments a tracking unit may comprise an electromagnet or the like in order to allow detection of the resulting magnetic field by a sensor located at any other tracking or central unit.

The strength of this magnetic field may be selected to vary in dependence upon the system properties; for example, the magnetic field may be selected so as to only be detectable by a neighbouring tracking unit (for example, the tracking unit 230 may emit a magnetic field with sufficient strength only for detection by the tracking unit 240). The selection of the required strength may be determined during a calibration step, either through a trial and error process, using strengths based on average separation (for example, average forearm length) or by determining the separation between tracking units optically or by user input (such as identifying the tracking units in an image obtained by a camera, or allowing a user to input their own measurements).

The magnetic field may be emitted in a pulsed fashion, so as to assist in separating the signal from environmental noise. In addition to this, such pulsing may assist in mitigating interference from other tracking units, or in identifying a particular tracking unit as a source of the magnetic field. For example a wrist based unit may sometimes be closer to a waist-mounted tracking unit than the intended elbow-mounted recipient, and so a timing regime that precluded communication outside a predetermined hierarchy of tracking units may be chosen. This will be discussed in more detail below.

Of course, in some embodiments each tracking unit is operable to emit signals according to both these methods.

In some embodiments, peripherals (for example, handheld controllers, such as the device 150 of FIG. 2) may be configured to act as additional tracking units that are also able to form a part of a system according to FIG. 4 or 5. For example, handheld peripherals may be operable to communicate with tracking units 230 located on the user's wrists or directly with the central unit 110.

It is envisaged that in some embodiments peripherals may be provided that are not equipped with the correct or sufficient hardware to be able to communicate with the other tracking units or the central unit. For example in the case of the PlayStation Move controller, it will transmit telemetry to the central unit, but will not be aware of the other tracking units. In such as case, the central unit can combine the separate telemetry feed from the peripheral with date from the other tracking units in order to treat the peripheral as (typically) the final tracking unit in a chain (for example head/shoulder/elbow/wrist/peripheral). Where a peripheral does not independently transmit telemetry, such a peripheral may be provided with markers or the like that are detectable by cameras (for example, a camera associated with the HMD) so as to enable tracking of the peripheral. This tracking data may be used to refine tracking data from the tracking units, or may be used as an input for constraining the expected position of the tracking units, for example.

Figure 6:
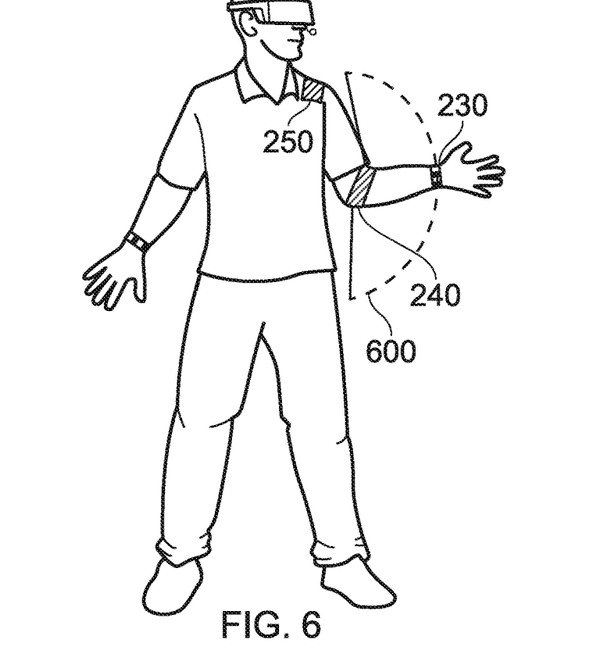
FIG. 6 schematically illustrates the possible range of motion of a tracking unit.

FIG. 6 schematically illustrates a possible range of motion of the tracking unit 230 relative to the tracking unit 240.

In FIG. 6, the shape 600 is a two-dimensional representation of the possible locations of the tracking unit 230 (corresponding to the user's wrist) for a fixed position of the tracking unit 240 (corresponding to the user's elbow). The tracking unit 230 may be located at any point along the dashed line of the shape 600—although in practice it is a surface that should be defined due to the possibility of three-dimensional motion. By constraining the possible locations of the tracking unit 230 in dependence upon the location of the tracking unit 240, tracking processes may be simplified. Similarly, the location of the tracking unit 240 may be predicted and/or constrained in dependence upon the position of one or both of the tracking units 230 and 250.

In an optical tracking process, it may be possible to identify candidate image areas where a particular tracking unit is expected to be. In wireless signal-based tracking processes, this information may be used to determine an expected signal strength so as to enable easier identification of tracking units.

The constraints may be determined using information about the average user's body; for example, an average joint length and range of motion may be used to identify possible and/or likely locations of tracking units relative to one another. Alternatively, or in addition, measurements may be taken using a camera associated with the tracking system, or signal strength readings or the like may be used to approximate a separation between tracking units. The user may be requested to perform different motions in order to assist with the measurements, for example rotating an arm to assist with determining arm length and range of motion. The user may also be able to input any measurements manually.

Figure 7:
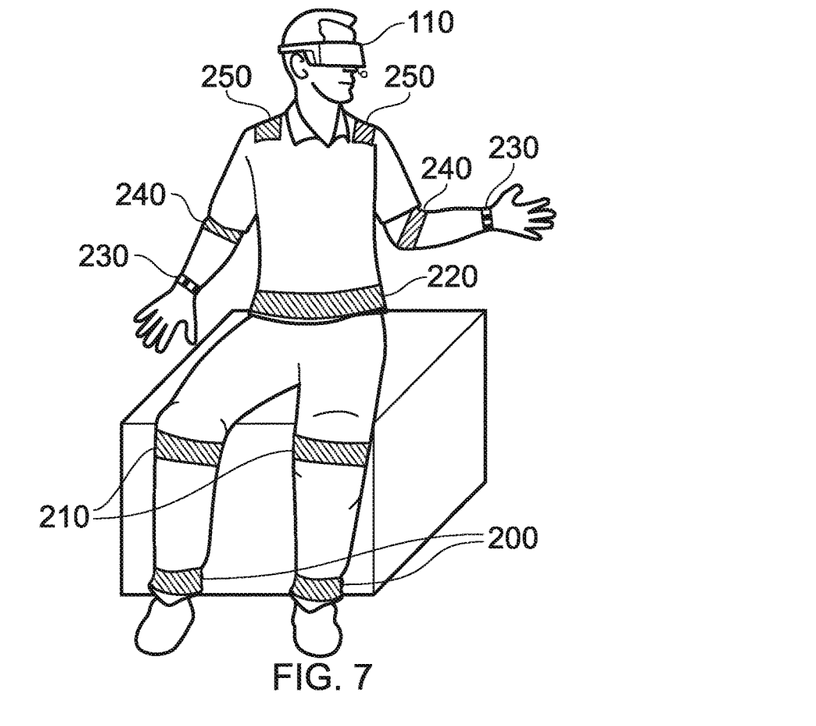
FIG. 7 schematically illustrates a tracking system used by a seated user.

FIG. 7 schematically illustrates a positional tracking system in use by a user that is seated.

In such a use case, a user's range of motion is restricted (for example, the user cannot move their legs back due to the seat) and as such a recalibration or modification to the constraints on tracking unit locations may be required (conversely if initial calibration occurred when the user was seated, then further calibration may be needed to accommodate a greater range of movements if the user subsequently stands up).

In addition to this, when the user is seated it may be considered that tracking of the user's legs and waist are not necessary. This is because if a user intends to use their legs as a motion input then they will generally stand up so as to be able to interact with the provided content in a more natural manner. In this case, tracking of the corresponding tracking units may be reduced in frequency or suspended altogether.

In practice, this reduction in tracking may be implemented by reducing the frequency with which image processing is performed for image areas corresponding to the particular tracking units. Alternatively, or in addition, communications between those tracking units and other units may be reduced in frequency such that updated position information is provided less frequently. Less accurate and/or precise positional information may also be generated, for example a less sophisticated image processing method may be used or a smaller data packet may be used that carries less precise position information.

The fact that a user is seated may be detected in a number of ways. For instance, context from the content itself may be used to identify whether a user's legs would comprise useful tracking inputs—in a scene in which a user is sitting on a train, for example, tracking the legs would not be of use.

Alternatively, or in addition, information relating to the tracking units may be used to identify when tracking of particular tracking units should be reduced or suspended. For example, tracking units that are idle (or have below threshold motion) for a predetermined amount of time may be candidates for reduced tracking. This is an example of a position identification unit being operable to identify the position of the user in dependence upon the location of tracking units with an above-threshold motion over time.

Alternatively, or in addition, positional relationships between tracking units may be used to identify a sitting position or the like. For example, should the tracking units 210 associated with the user's knees be detected to be at a similar height to the tracking unit 220 associated with the user's waist, it may be assumed that the user is sitting as this is not possible in a natural standing position. Of course, a time-based threshold may be applied so as to distinguish between sitting and jumping with legs raised, for example.

Figure 8:
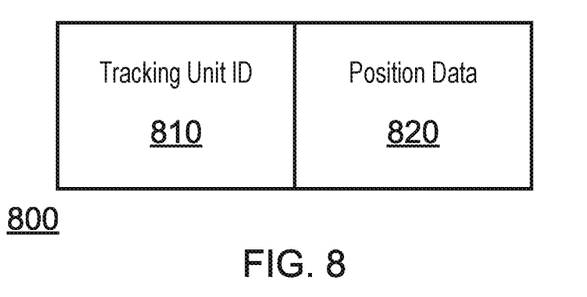
FIG. 8 schematically illustrates a data format for use by a tracking unit.

FIG. 8 schematically illustrates a data format for transmitting tracking unit identification and position data relating to a tracking unit. The data format 800 comprises a tracking unit ID field 810 and a position data field 820.

The tracking unit ID field 810 comprises information that is operable to identify a tracking unit. This may comprise any suitable identification; for example, a MAC code or serial number, a name/number associated with the device or a descriptive label (e.g. 'user's left elbow').

The position data field 820 may comprise any data used to locate the tracking unit. For example, information obtained from accelerometers or gyroscopes may be provided in the position data field 820. Optionally where a tracking unit has position sensors of several kinds (e.g. accelerometer, gyro, strain gauge, magnetic field sensor, camera with SLAM processing, etc.), then separate position data fields 820 may be used for each kind.

Figure 9:
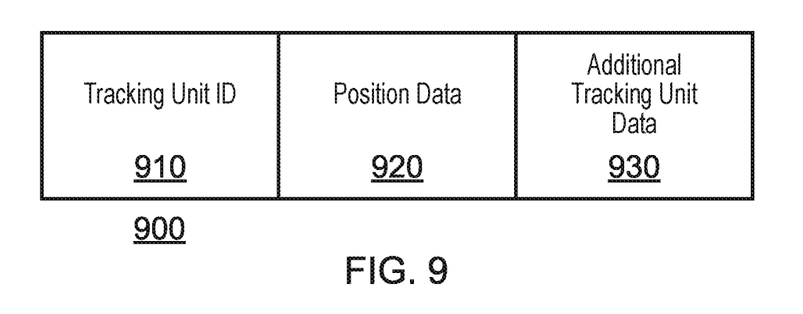
FIG. 9 schematically illustrates a further data format for use by a tracking unit.

FIG. 9 schematically illustrates a further data format for transmitting tracking unit identification and position data. The data format 900 of FIG. 9 comprises a tracking unit ID field 910 and a position data field 920 that correspond to the respective fields 810 and 820 of FIG. 8, in addition to an additional tracking unit data field 930. The data format 900 of FIG. 9 may be suitable for use in a hierarchical tracking unit system.

The additional tracking unit data field 930 may comprise any other information that may assist with the tracking of the units, such as information that informs other devices of a tracking unit's position in the hierarchy of tracking units; this may assist in constraining the position of the tracking unit. Alternatively, or in addition, the additional tracking unit data field 930 may be used to store information (such as tracking unit IDs and position data) relating to other tracking units in the hierarchy.

Figure 10:
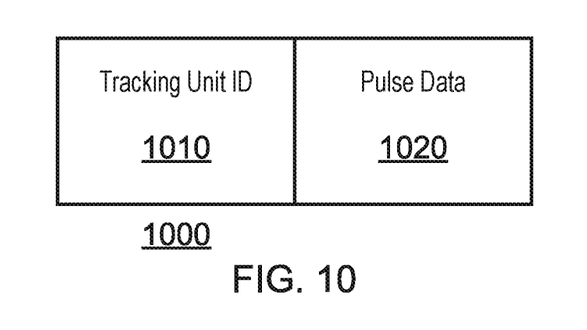
FIG. 10 schematically illustrates a timing schedule format for use by a tracking unit.

FIG. 10 schematically illustrates a data format for transmitting information for identifying a tracking unit using magnetic (or other) pulse data. The data format 1000 of FIG. 10 comprises a tracking unit ID field 1010 (which may be similar to the tracking unit ID 810 of FIG. 8) and a pulse data field 1020.

The data format 1000 of FIG. 10 may be transmitted using any suitable data transfer method, in conjunction with the transmission of magnetic pulses for communication. Of course, in an arrangement in which the magnetic field is not pulsed the pulse data 1020 is rendered obsolete and so may be omitted from the data format 1000.

The pulse data 1020 may indicate a timing schedule in line with which the tracking unit emits magnetic pulses. This could be indicated using a label corresponding to manufacturer-defined schedules, for example, or a timestamp indicating a start time and an interval between pulses. Further information could be provided that indicates the strength and/or duration of the pulses.

Figure 11:
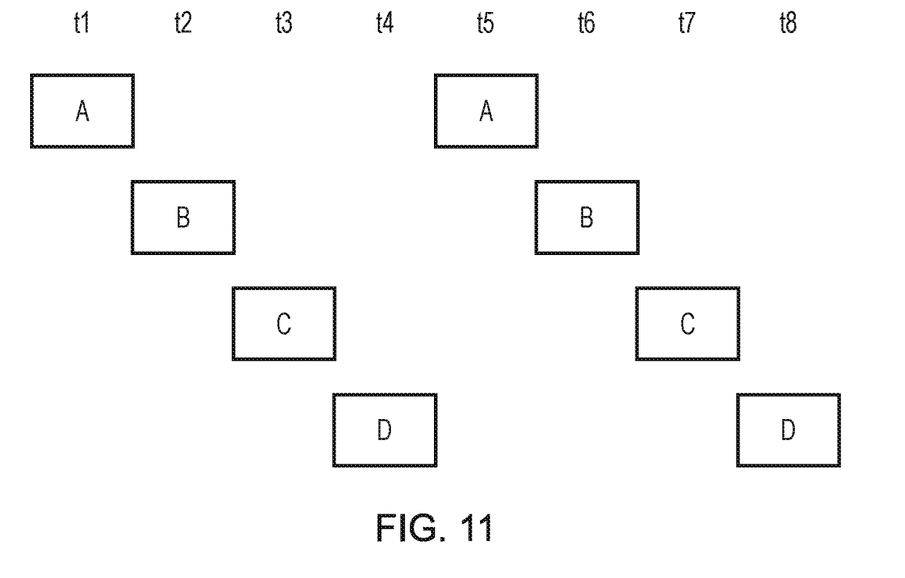
FIG. 11 schematically illustrates a timing schedule used by a plurality of tracking units.

FIG. 11 schematically illustrates an example of a pulsed magnetic field (or other output) schedule for use by a plurality of tracking units. Such a pulsed magnetic field output schedule being used by a plurality of tracking units may be advantageous, as it can assist a processing device in differentiating between outputs from tracking units and noise from the surrounding environment. In addition to this, such a schedule may simplify the tracking process when tracking units are operable to measure outputs from other tracking units in addition to outputting their own signals, such as in the hierarchical arrangement described above.

The schedule of FIG. 11 may be used for a system comprising 4 tracking units; here, labelled 'A', 'B', 'C', and 'D'. Of course, this may be adapted for use with any number of tracking units—for example, in a system with only two tracking units 'A' could occupy all odd-numbered time slots and 'B' the even.

Of course, the tracking devices may be pre-configured to use particular time slots and the processing unit may be required to identify which tracking is pulsing at which time, rather than having to inform each device of the schedule being used and to assign times to each tracking unit. In such a case, each of the plurality of tracking units may be operable to transmit a signal identifying the transmitting tracking unit and timing information of the associated magnetic pulses.

In this schedule, device A is operable to emit magnetic pulses in time periods t1 and t5, device B in time periods t2 and t6, device C in time periods t3 and t7, and device D in time periods t4 and t8. Of course, the schedule may be defined as an interval between pulses rather than a set of times—for example, devices could be configured to pulse for time T every 3T in this arrangement with devices having different offsets. Such a schedule may be managed by the HMD or the unit that measures the pulses, for example.

Such a schedule may also be used for subsets of the tracking units that make up the system. For example, each hierarchical section (as discussed above) could use its own schedule—each arm could use a schedule with 3 tracking units (shoulder, elbow, wrist). Despite the time slots being shared with other tracking units (as each elbow would transmit magnetic pulses at the same time, for example), in many cases it is possible to distinguish between the units with the shared timing based upon signal strength.

This distinguishing may be performed in a number of different ways. In some embodiments, images captured of the tracking units may be used to estimate an expected signal strength for each tracking unit—the measured signal strengths may then be used to refine this estimate to provide more accurate tracking. In some embodiments, tracking units utilising the same time slots may be configured to use different signal strengths, to assist with differentiation—for example, each shoulder may be expected to be a similar distance from the HMD and so a suitably different signal strength can be used to distinguish between them rather than being taken as an indicator of increased separation. Previously-obtained tracking information may also be used in generating such an estimate, for example by considering the speed at which a user is moving and predicting a new up-to-date location.

Rather than varying the signal strength of each tracking unit individually, it may be possible to assign time slots in the schedule to tracking units based upon an expected measurement. For example, a user's left shoulder and right foot are extremely unlikely to be measured to have the same signal strength as measured by the HMD (or whichever device performs the tracking measurements) and as such they are good candidates for sharing a time slot in the schedule.

In some embodiments, it may also be possible to assign pulse patterns to tracking units within the time periods designated by the schedule. For example, in the time periods t1 and t5 tracking unit A may pulse twice, while a different tracking unit assigned to the same time periods may be configured to only pulse once.

Separately, when a magnetic field is used to detect motion using magnetic field sensors, again a pulsed magnetic field may be used so as to distinguish between a background field caused by the earth and any nearby electromagnetic sources, and the reference pulsed field. In this case, optionally different magnetic field sensors may detect the field according to a similar schedule to that disclosed in FIG. 11.

Figure 12:
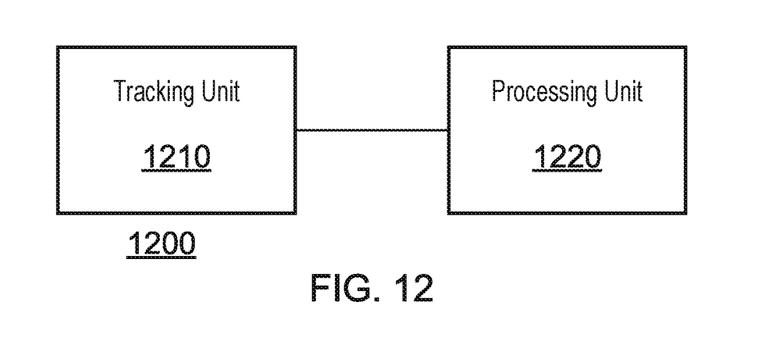
FIG. 12 schematically illustrates a positional tracking system.

FIG. 12 schematically illustrates a positional tracking system 1200. The positional tracking system 1200 comprises one or more tracking units 1210 and a processing unit 1220. While shown as two distinct units, the processes performed by each of these units may instead be performed by any number of devices as is suitable; for example, some elements of the processing may be performed at either the tracking unit 1210 or the processing unit 1220, or at a third device (not shown) that may be more suitable for performing the processing. For example, the functions of the positional tracking system may be distributed between the tracking units, HMD 110 and processing device 120.

As discussed above, the positional tracking system 1200 may comprise further devices and/or functionality other than that described here. For example, the positional tracking system 1200 may comprise a camera that is operable to capture images of one or more of the plurality of tracking units (the captured images are used to identify tracking units and their respective positions).

Figure 13:
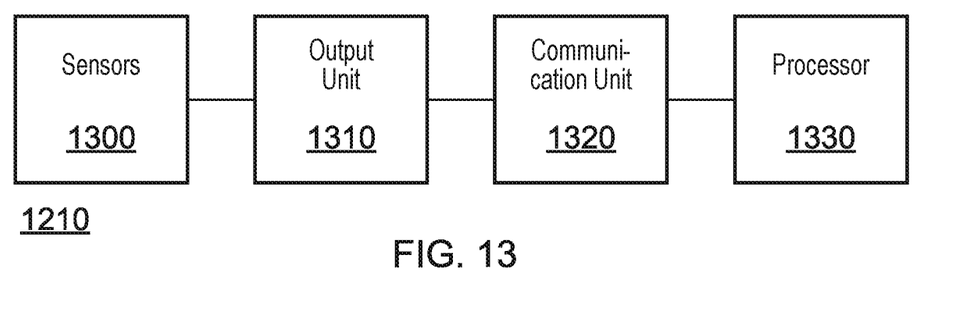
FIG. 13 schematically illustrates a tracking unit.

The tracking unit(s) 1210 may be provided with the functional units described with reference to FIG. 3, for example. Alternatively, or in addition, the tracking units 1210 may be configured as shown in FIG. 13 as is discussed below. The processing unit 1220 is described in more detail with reference to FIG. 14.

FIG. 13 schematically illustrates the tracking unit 1210. This comprises sensors 1300, an output unit 1310, a communication unit 1320 and a processor 1330.

The sensors 1300 may comprise any suitable sensors for measuring position, such as accelerometers and gyroscopes. In some embodiments, tracking units 1210 may also comprise sensors suitable for detecting a magnetic field output from another tracking unit—for example, in the hierarchical arrangements discussed above—or from a remotely positioned common reference magnetic source.

The output unit 1310 is operable to output magnetic (or other) signals for detection by other tracking units or the processing unit 1220. As discussed with reference to FIG. 11, a pulsed output scheme may be adopted so as to improve the accuracy of the tracking process.

The communication unit 1320 is operable to transmit information to other tracking units and/or processing devices. This information may comprise tracking unit identification information and position/motion information, in accordance with FIG. 8, 9 or 10, for example.

Each of the outputs of the output unit 1310 and communication unit 1320 are examples of a transmitted signal from the tracking unit. Therefore, transmitted signals may comprise information identifying the transmitting tracking unit and its position and/or orientation, and/or magnetic fields (pulsed or otherwise).

The processor 1330 is operable to perform any processing required for the operation of the tracking unit 1210. This may comprise controlling the output of the output unit 1310 or communication unit 1320, for example. Alternatively, or in addition, the processor 1330 may be operable to generate information for transmission by the communication unit 1320 in dependence upon information received from other tracking units—for example, in the hierarchical arrangement discussed above.

Of course, further features may be provided by the tracking unit 1210. For example, the tracking units may comprise haptic feedback modules (such as vibrating elements) operable to provide haptic feedback to a user and/or audio output units (such as speakers) operable to provide audio to a user. These may be particularly advantageous, as by using the tracking information for the tracking units 1210 sound and/or feedback may be provided in appropriate locations, increasing the immersion experienced by the user.

Figure 14:
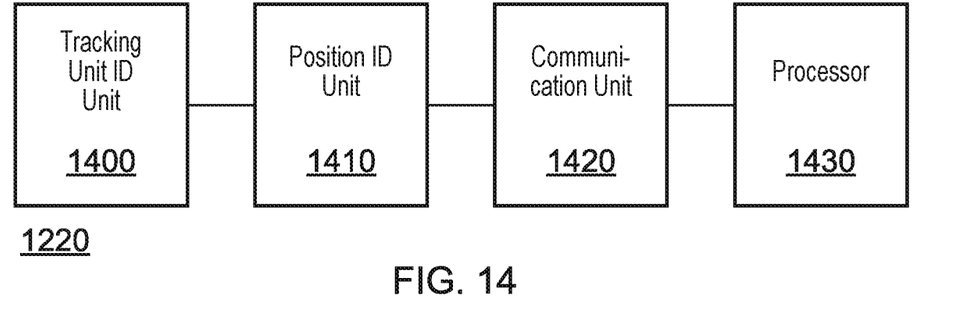
FIG. 14 schematically illustrates a processing unit.

FIG. 14 schematically illustrates the processing unit 1220. This comprises a tracking unit identification unit 1400, a position identification unit 1410, a communication unit 1420 and a processor 1430.

The tracking unit identification unit 1400 is operable to identify tracking units in the positional tracking system. This may comprise combining tracking unit ID information with information about where on the body the tracking unit is worn, for example. As discussed above, the results of image processing performed on images captured of the user of the tracking units may be used to assist in this identification.

The position identification unit 1410 is operable to determine the position of the tracking units 1210. This may be performed using magnetic pulse information, transmitted sensor information, optical tracking methods, or any combination of these.

The communication unit 1420 is operable to send and/or receive information from the one or more tracking units 1210. In some embodiments, the communication unit 1420 may also be operable to detect magnetic signals emitted by one or more of the tracking units 1210.

The processor 1430 is operable to perform any additional processing that may be required by the processing unit 1220. For example, the processor 1430 may be operable to generate the pulse schedule described with reference to FIG. 11.

FIGS. 12-14 therefore schematically illustrate a positional tracking system for tracking a user, the system comprising a plurality of tracking units 1210 to be worn by a user, a tracking unit identification unit 1400 operable to identify the plurality of tracking units, and a position identification unit 1410 operable to identify a position of a user in dependence upon the location of the plurality of tracking units, wherein each of the plurality of tracking units is operable to transmit a signal that may be used to locate that tracking unit.

Figure 15:
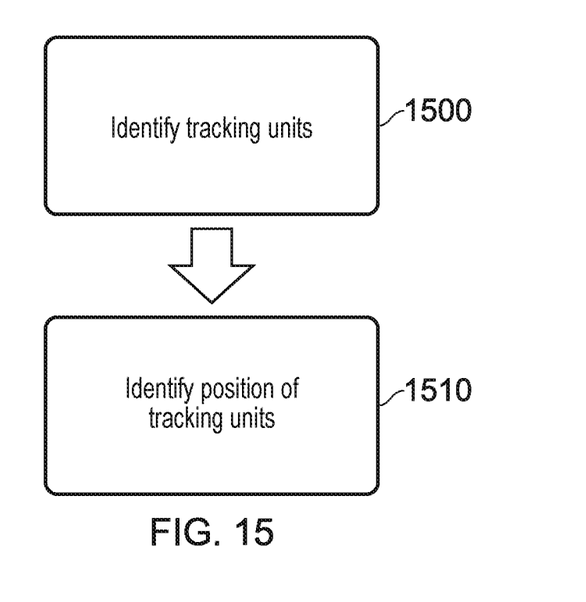
FIG. 15 schematically illustrates a positional tracking method.

FIG. 15 schematically illustrates a positional tracking method.

A step 1500 comprises identifying the tracking units, for example using identification information transmitted by the tracking units.

A step 1510 comprises identifying the position of the identified tracking units. This may be performed using any of the methods described above.

Figure 16:
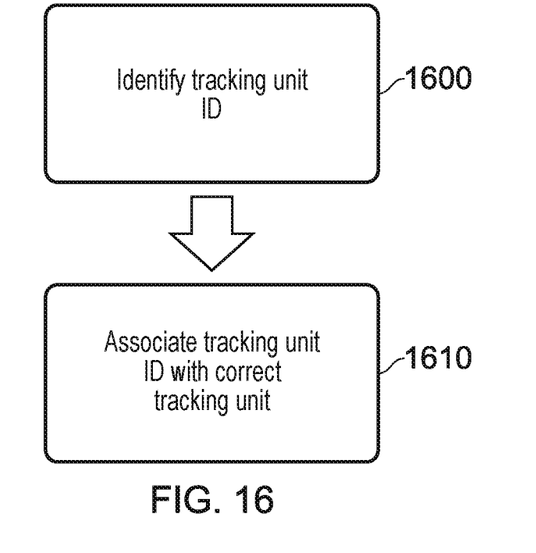
FIG. 16 schematically illustrates a tracking unit identification method.

FIG. 16 schematically illustrates a tracking unit identification method, which may correspond to step 1500 of FIG. 15, for example.

A step 1600 comprises identifying the tracking unit ID from information provided by the tracking unit. This may be a label identifying an associated part of the user's body (such as identifying the tracking unit as being used as a 'left elbow' tracking unit), a serial number or the like, or any other method of distinguishing between tracking units.

A step 1610 comprises the associating of the tracking unit ID with the correct tracking unit. This may be assisted by a user, for example as a part of a calibration process (in which a user is requested to move a particular tracking unit, for example), or may be possible using image processing techniques performed on an image captured of the user—for example, each tracking unit may have an identifiable tag displayed. In some embodiments, the serial number of the tracking unit could be encoded visually (either as a number or a pattern) on the unit to enable easier identification in images.

Figure 17:
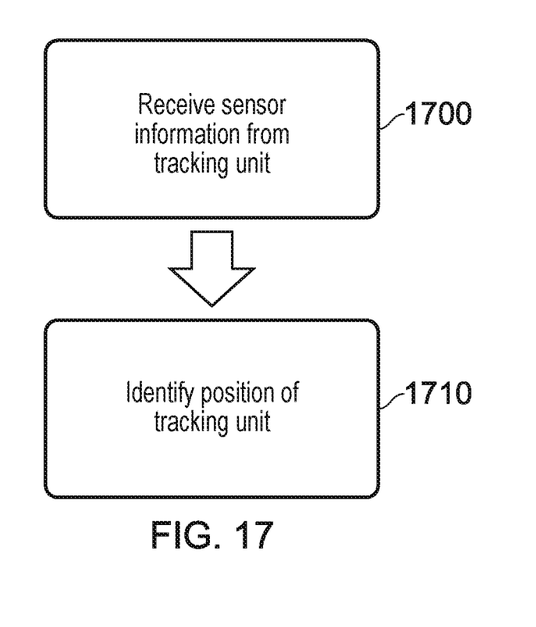
FIG. 17 schematically illustrates a first position identification method.

FIG. 17 schematically illustrates a position identifying method, which may correspond to step 1510 of FIG. 15, for example.

A step 1700 comprises receiving sensor information from the one or more tracking units. This may comprise accelerometer and/or gyroscope measurement information, for example, or magnetic sensor readings. In some embodiments, both may be used—for example, position measurements may be obtained using magnetic sensors whilst orientation is determined using other sensor measurements.

A step 1710 comprises identifying the position of the one or more tracking units using the information obtained in step 1700. This may be performed by updating a model of tracking unit positions, for example, or by otherwise deriving the positions from the received data.

Figure 18:
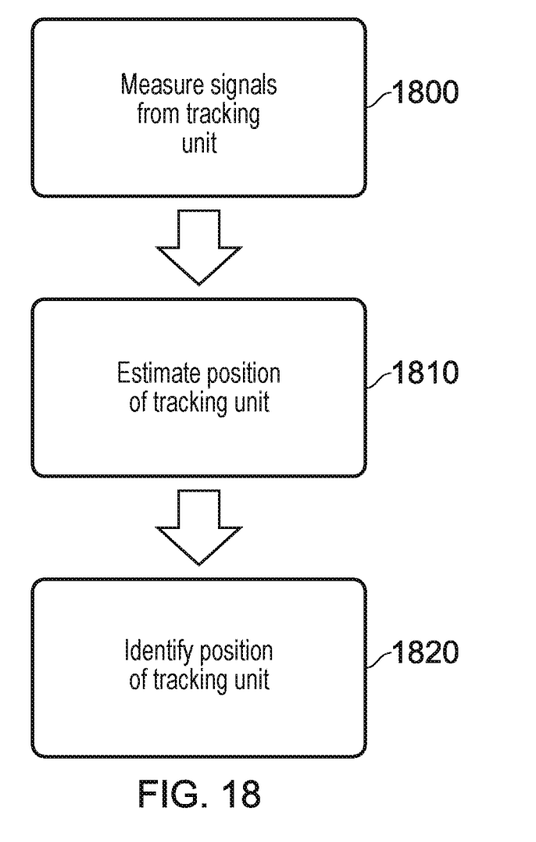
FIG. 18 schematically illustrates a second position identification method.

FIG. 18 schematically illustrates an additional/alternative method for determining the position of the one or more tracking units; this may be used instead of (or in combination with) the method of FIG. 17.

A step 1800 comprises measuring signals from a tracking unit, for example magnetic signals. This may be performed entirely by a central tracking unit, such as the HMD, or a hierarchical system may be used such that tracking units are operable to perform their own measurements and a reduced number of devices report the results to the central tracking unit.

A step 1810 comprises estimating the position of one or more tracking units in the tracking system. This step is optional, as the identification could be performed without an initial estimation. This step may comprise a low-accuracy image processing based method, for example, or analysis of a model of the user and previously obtained tracking information in order to estimate the position of the one or more tracking units. In some embodiments, a skeletal model is generated and maintained (for example, updated with new tracking measurements with an appropriate frequency) that is used to estimate the user's position.

A step 1820 comprises identifying the position of one or more tracking units. This may be performed independently of step 1810 (whether or not step 1810 is performed), or it may be a refinement of the position estimated in step 1810.

In utilising a method according to FIG. 18, it is apparent that the position identification unit is operable to use a first position identification method to estimate a user's position, and a second position identification method to refine the estimated position.

FIGS. 15-18 each exemplify steps of a positional tracking method for use with a positional tracking system comprising a plurality of tracking units to be worn by a user, the method comprising identifying the plurality of tracking units and identifying a position of a user in dependence upon the location of the plurality of tracking units, wherein each of the plurality of tracking units is operable to transmit a signal that may be used to locate that tracking unit.

While such a method is disclosed here as corresponding to a single user, of course any number of users may be present in the same environment and tracking may be performed on an individual basis. Each user may be associated with a set of tracking devices, which may be distinguished from one another in any suitable manner, and each set of tracking devices may be tracked by a respective central unit or the same central unit. This may be advantageous over camera-based arrangements in that the potential for occlusions of users with respect to a camera is reduced.

For example, each of the tracking devices may transmit a separate set ID to identify which set they belong to, or transmission may be performed on a time-division basis so as to separate the signals temporally. In some examples, the set ID may be included in the tracking unit ID 810/910/1010. Of course, such transmission may be configured to only occur when multiple sets of tracking units are present in the same environment; where only a single set is present, it may be advantageous to omit the transmission of a set ID.

Either of these may be examples of embodiments wherein a plurality of users are each provided with a plurality of tracking units, and wherein the tracking unit identification unit is operable to correlate a tracking unit with a corresponding user.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public

The invention claimed is:

1. A positional tracking system for tracking a user, the system comprising:
   a plurality of tracking units to be worn by a user;
   a tracking unit identification unit operable to identify at least one of the plurality of tracking units; and
   a position identification unit operable to identify a position of a user in dependence upon the location of the plurality of tracking units,
   wherein each respective one of the plurality of tracking units is operable to determine its position and/or orientation and transmit a respective signal that may be used to locate that tracking unit; and
   wherein each respective signal comprises information identifying the respective one of the plurality of tracking units and its position and/or orientation.

2. The system according to claim 1, wherein the transmitted signal comprises a magnetic field.

3. The system according to claim 2, wherein the magnetic field is pulsed.

4. The system according to claim 3, wherein each of the plurality of tracking units is also operable to transmit a signal identifying the transmitting tracking unit and timing information of the associated magnetic pulses.

5. The system according to claim 1, the system also comprising a camera that is operable to capture images of one or more of the plurality of tracking units, and the captured images are used to identify tracking units and their respective positions.

6. The system according to claim 1, wherein the position identification unit is operable to identify the position of the user in dependence upon the location of tracking units with an above-threshold motion over time.

7. The system according to claim 1, wherein the tracking units comprise haptic feedback modules operable to provide haptic feedback to a user and/or audio output units operable to provide audio to a user.

8. The system according to claim 1, wherein the plurality of tracking units are grouped into two or more groups, and are configured to communicate with and detect outputs of other tracking units in that group.

9. The system according to claim 8, wherein each of the tracking units is operable to communicate with a next tracking unit in the group, with a single tracking unit in each group being configured to communicate with a device other than a tracking unit.

10. The system according to claim 1, wherein the position identification unit is operable to use a first position identification method to estimate a user's position, and a second position identification method to refine the estimated position.

11. The system according to claim 10, wherein the first position identification method uses a skeletal model to estimate the user's position.

12. The system according to claim 1, wherein a plurality of users are each provided with a plurality of tracking units, and wherein the tracking unit identification unit is operable to correlate a tracking unit with a corresponding user.

13. A positional tracking method for use with a positional tracking system comprising a plurality of tracking units to be worn by a user, the method comprising:
   identifying at least one of the plurality of tracking units; and
   identifying a position of a user in dependence upon the location of the plurality of tracking units,
   wherein each respective one of the plurality of tracking units is operable to determine its position and/or orientation and transmit a respective signal that may be used to locate that tracking unit; and
   wherein each respective signal comprises information identifying the respective one of the plurality of tracking units and its position and/or orientation.

14. A non-transitory, computer readable storage medium containing a computer program which, when executed by a computer, causes a computer to perform a positional tracking method for use with a positional tracking system comprising a plurality of tracking units to be worn by a user, by carrying out actions, comprising:
   identifying at least one of the plurality of tracking units; and
   identifying a position of a user in dependence upon the location of the plurality of tracking units,
   wherein each respective one of the plurality of tracking units is operable to determine its position and/or orientation and transmit a respective signal that may be used to locate that tracking unit; and
   wherein each respective signal comprises information identifying the respective one of the plurality of tracking units and its position and/or orientation.

* * * * *